(12) United States Patent
Quix et al.

(10) Patent No.: US 10,279,656 B2
(45) Date of Patent: May 7, 2019

(54) VEHICLE HEATING SYSTEM AND METHOD OF USING THE SAME

(71) Applicant: FORD GLOBAL TECHNOLOGIES, LLC, Dearborn, MI (US)

(72) Inventors: Hans Guenter Quix, Herzogenrath (DE); Andreas Kuske, Limburg (NL); Franz Arnd Sommerhoff, Aachen (DE); Norbert Andreas Schorn, Aachen (DE); Helmut Matthias Kindl, Aachen (DE); Vanco Smiljanovski, Bedburg (DE); Joerg Kemmerling, Monschau (DE)

(73) Assignee: Ford Global Technologies, LLC, Dearborn, MI (US)

( * ) Notice: Subject to any disclaimer, the term of this patent is extended or adjusted under 35 U.S.C. 154(b) by 846 days.

(21) Appl. No.: 14/294,414

(22) Filed: Jun. 3, 2014

(65) Prior Publication Data

US 2014/0374498 A1 Dec. 25, 2014

(30) Foreign Application Priority Data

Jun. 20, 2013 (DE) .................. 10 2013 211 700

(51) Int. Cl.
*B60H 1/04* (2006.01)
*B60H 1/02* (2006.01)
(Continued)

(52) U.S. Cl.
CPC ............. *B60H 1/04* (2013.01); *B60H 1/02* (2013.01); *B60H 1/025* (2013.01); *B60K 11/02* (2013.01);
(Continued)

(58) Field of Classification Search
CPC ............. B60H 1/04; B60H 1/02; B60H 1/025
See application file for complete search history.

(56) References Cited

U.S. PATENT DOCUMENTS

| 4,949,903 A * | 8/1990 | Hayashi | .................. B60H 1/02 237/12.3 A |
| 5,048,752 A * | 9/1991 | Hintennach | ............ B60H 1/032 123/142.5 R |

(Continued)

FOREIGN PATENT DOCUMENTS

| CN | 101011933 | 10/2006 | |
| DE | 102007061495 A1 * | 6/2009 | .............. F01P 7/165 |

(Continued)

OTHER PUBLICATIONS

Pott, et al, DE 102007061495 A1 English machine translation, Jun. 25, 2009.*

(Continued)

*Primary Examiner* — Gregory L Huson
*Assistant Examiner* — Phillip Decker
(74) *Attorney, Agent, or Firm* — LeClairRyan

(57) ABSTRACT

In one or more embodiments, the present invention provides a vehicle heating system for a vehicle with an engine and a charge air cooler, the vehicle heating system including a high-temperature cooling circuit coupled to the engine, a low-temperature cooling circuit coupled to the charge air cooler and including a low temperature cooler, and a heating heat exchanger coupled to the low-temperature cooling circuit.

14 Claims, 8 Drawing Sheets

(51) Int. Cl.
  *B60K 11/02* (2006.01)
  *F02B 29/04* (2006.01)
  *F01P 7/16* (2006.01)

(52) U.S. Cl.
  CPC .......... *F01P 7/165* (2013.01); *F01P 2060/02* (2013.01); *F01P 2060/08* (2013.01); *F02B 29/0406* (2013.01)

(56) References Cited

U.S. PATENT DOCUMENTS

| | | | | |
|---|---|---|---|---|
| 5,174,254 A * | 12/1992 | Humburg | ............ | B60H 1/00485 123/142.5 R |
| 5,215,044 A * | 6/1993 | Banzhaf | ............... | F01P 1/00 123/41.05 |
| 5,765,511 A * | 6/1998 | Schatz | ............... | B60H 1/00492 123/41.14 |
| 6,467,538 B1 * | 10/2002 | Acre | ................ | B60H 1/02 165/266 |
| 6,557,502 B2 * | 5/2003 | Ban | ................ | B60H 1/00492 123/41.14 |
| 7,047,913 B2 * | 5/2006 | Werner | ............... | F02B 29/0443 123/41.29 |
| 7,649,273 B2 * | 1/2010 | Zillmer | ................ | B60K 6/485 123/41.31 |
| 7,669,416 B2 * | 3/2010 | Pantow | .................. | F01P 5/12 123/41.01 |
| 7,806,091 B2 * | 10/2010 | Esau | ................. | F02B 29/0412 165/145 |
| 9,103,275 B2 * | 8/2015 | Quix | ................. | F02B 33/34 |
| 9,739,194 B2 * | 8/2017 | Kuske | ................. | F02B 29/045 |
| 2003/0037776 A1 * | 2/2003 | Ban | ................. | B60H 1/02 123/634 |
| 2004/0060316 A1 * | 4/2004 | Ito | ................. | B60H 1/00328 62/324.1 |
| 2006/0231235 A1 * | 10/2006 | Yamanaka | ............... | F01N 5/02 165/51 |
| 2008/0264609 A1 * | 10/2008 | Lutz | ............... | F28D 7/0091 165/104.19 |
| 2009/0020079 A1 * | 1/2009 | Muller | ................. | F01P 7/165 123/41.1 |
| 2009/0078220 A1 * | 3/2009 | Meyer | ................. | F01P 7/165 123/41.31 |
| 2012/0241139 A1 * | 9/2012 | Katoh | ................. | F28D 1/0426 165/202 |
| 2012/0297765 A1 * | 11/2012 | Vigild | ................. | F01P 3/20 60/599 |
| 2014/0245735 A1 * | 9/2014 | Kuske | ................. | F02B 29/0443 60/599 |
| 2018/0010859 A1 * | 1/2018 | Renz | ................. | F28D 9/005 |
| 2018/0215234 A1 * | 8/2018 | Lott | ................. | B60H 1/00764 |

FOREIGN PATENT DOCUMENTS

| | | | | |
|---|---|---|---|---|
| EP | 0622256 A1 * | 11/1994 | ......... | B60H 1/00485 |
| EP | 2039906 A1 * | 3/2009 | ......... | F02B 29/0418 |
| EP | 3023622 A1 * | 5/2016 | | |

OTHER PUBLICATIONS

Chevalier, EP2039906A1 English machine translation, Mar. 25, 2009.*

* cited by examiner

VEHICLE HEATING SYSTEM AND METHOD OF USING THE SAME

RELATED APPLICATION(S)

This application claims the benefit of Germany Patent Application No.: 102013211700.0, filed Jun. 20, 2013, the entire contents thereof being incorporated herein by reference.

TECHNICAL FIELD

The disclosed inventive concept relates generally to vehicle heating system and method of using the same.

BACKGROUND

Vehicle heating systems are used to heat the interior of a closed vehicle independently of external influences. In addition to the increase in comfort thus achieved, such systems also assume functions relevant to safety. Above all in this context there is clear vision through the glazed portions of the vehicle. Thus, for example, low external temperatures lead to condensation of the water vapor in the interior on the windows. As a result, these can mist up or even ice up, obscuring or even preventing vision.

Particularly in the case of motor vehicles, a not insignificant part of the energy obtained from the fuel in the internal combustion engine is converted into heat. To ensure economical and, in particular, long-lasting use of the internal combustion engine, the engine must be operated within a particular temperature range. In order to keep within this range, especially at the top, appropriate cooling measures are required. For this purpose, air cooled internal combustion engines have areas with a generally rib-type external structure. By means of the surface area enlarged in this way, some of the operational heat is released to the ambient air. In the case of water cooled internal combustion engines, in contrast, the coolant flowing around the engine block and the cylinder head via ducts initially absorbs a large proportion of the waste heat that arises. To prevent continuous heat absorption and overheating of the coolant, this coolant is then passed through a suitable cooler. In the process, some of the heat is released to the ambient air via the cooler, which is designed as a gas/coolant heat exchanger.

Ever since the introduction of water cooling, the coolant used has also been used to heat the interior of the vehicle. For this purpose a heating heat exchanger has been integrated into the high-temperature cooling circuit of the internal combustion engine in addition to the cooler. Designed as a gas/coolant heat exchanger, this enables the heat energy contained in the coolant to be released to the air in the interior of the vehicle. For this purpose, air is drawn in from the outside or from the interior and directed past the heating heat exchanger or through the latter. During this process, the air absorbs some of the heat energy before being directed into the interior of the vehicle.

To increase the effectiveness of modern internal combustion engines, they are increasingly being supplied with compressed combustion air. The turbochargers or gas-dynamic pressure wave machines used for this purpose are driven electrically or by the flow of exhaust gas from the motor vehicle. The aim is to compress the induced air in order to increase the proportion of oxygen ($O_2$) per unit volume and thus to increase reactivity. In this way, more effective combustion of the fuel is achieved. Moreover, modern internal combustion engines can in this way develop a high power, despite smaller displacements.

Compression of the intake air is associated with an increase in the temperature thereof. To further increase enrichment with oxygen, the air compressed in this way must be cooled before being introduced into the internal combustion engine.

Further developments envisage the use of charge air coolers, which remove some of the heat energy from the combustion air. In order to release the heat withdrawn from the combustion air to the environment, the charge air cooler can also be incorporated together with another cooler into a separate low-temperature cooling circuit.

A charge air cooler system which has an integrated heating device is known from the as yet unpublished DE 10 2013 203 643.4. The turbocharger arrangement used for this purpose includes an internal combustion engine that can be pressure charged by means of at least one turbocharger and a charge air cooler which is arranged between the turbocharger and the internal combustion engine and is situated in an intake section. In this case, the charge air cooler is coupled to a low-temperature cooling circuit, while the internal combustion engine is coupled to a high-temperature cooling circuit. In order to remove the condensate which sometimes arises with pressure charged internal combustion engines, the heat energy of the high-temperature cooling circuit is used to heat the low-temperature cooling circuit.

DE 10 2013 206 082.3, which is likewise not yet published, discloses an engine system for a vehicle which includes an internal combustion engine, a turbocharger and a charge air cooler. The internal combustion engine and the charge air cooler are furthermore coupled to respective cooling circuits. In order to allow the operating temperature of the internal combustion engine to be reached in as timely a manner as possible, a number of modifications with respect to the path within the cooling circuits are proposed, wherein a low-temperature cooling circuit is used to heat a high-temperature cooling circuit.

In order to enable the internal combustion engine to be heated up as quickly as possible when started cold, the high-temperature cooling circuit thereof is initially reduced in size. In this case, most of the coolant flows around the engine block and the cylinder head without releasing the heat energy thus absorbed to a heat exchanger. After a predetermined coolant temperature has been reached, the small cooling circuit is enlarged by incorporating any heat exchangers. Especially during the cold running phase of the internal combustion engine after the cold starting of the latter, there is thus a relatively long period of time during which there is not enough warm coolant available to heat the interior.

Diesel and gasoline engines, which are becoming ever more efficient with advances in development, allow increased conversion of the fuel into the desired kinetic energy. Owing to the consequent increase in efficiency, there is a simultaneous decrease in the heat which arises in the combustion process. Consequently, the waste heat from modern combustion engines is sometimes no longer enough to ensure heating of the interior to a sufficient level. For this reason, there is a need to use auxiliary heaters, which generate the heat energy that is lacking when required. For most markets, "PTC" heating elements are typically used for this purpose, these converting electric energy into heat energy. The use thereof is due especially to the fact that the PTC heating elements manage without exposed heating wires and thus do not represent a possible safety hazard.

PTC heating elements or PTC thermistors are ceramic semiconductors, the electric resistance of which varies abruptly from time to time as a function of the temperature. Here, "PTC" stands for "Positive Temperature Coefficient", indicating a reduction in electric resistance at low temperatures. As a result, there is a kind of self-regulation since the heat energy generated by means of the PTC heating elements depends on the already existing temperature. As soon as a particular temperature is exceeded, the electric resistance of the PTC thermistors increases in such a way that no more additional heat energy is generated.

Despite these advantages, the use of PTC heating elements in vehicles is correspondingly costly. Moreover, the vehicle weight and complexity of the vehicle heating system are increased. In addition, an auxiliary heater of this kind requires electric energy which, in turn, must be made available by the generator operated by the internal combustion engine. Since other loads on board the vehicle must also be supplied, the electric energy available for one or more such auxiliary heaters is limited, especially when the internal combustion engine is idling. In combination with modern internal combustion engines, which are more effective overall and, at the same time, produce less waste heat, the required heating systems for heating the interior therefore also still leave room for improvement.

SUMMARY

In one or more embodiments, the present invention provides a vehicle heating system for a vehicle with an engine and a charge air cooler, the vehicle heating system including a high-temperature cooling circuit coupled to the engine, a low-temperature cooling circuit coupled to the charge air cooler and including a low temperature cooler, and a heating heat exchanger coupled to the low-temperature cooling circuit.

The low-temperature cooling circuit may further include a bypass for bypassing the low-temperature cooler.

The heating heat exchanger may be positioned downstream of the charge air cooler.

The vehicle heating system may further include a valve operable in first and second positions, when in one of the first and second positions, the heating heat exchanger is in communication with the low-temperature cooling circuit via a bypass downstream of the valve. Optionally, the valve may be positioned downstream of the charge air cooler and upstream of the heating heat exchanger.

The high-temperature cooling circuit may be decoupled from the low-temperature cooling circuit.

The present invention in one or more embodiments further provides a method of heating an interior of a vehicle including an engine and a charge air cooler, the method including providing to the vehicle a vehicle heating system, wherein the vehicle heating system includes a high-temperature cooling circuit coupled to the engine and having a first heating heat exchanger and a thermostat, and a low-temperature cooling circuit coupled to the charge air cooler and having a second heating heat exchanger. Optionally, the high-temperature cooling circuit and the low-temperature cooling circuit may be operated with no exchange of coolant there between.

The method may further include transporting a low-temperature coolant from the charger air cooler to the second heating heat exchanger to produce a cooled low-temperature coolant.

The method may further include pumping the cooled low-temperature coolant via a pump to produce a pumped cooled low-temperature coolant.

The method may further include transporting the pumped cooled low-temperature coolant to a low-temperature cooler.

The method may further include transporting a first portion of the pumped cooled low-temperature coolant to a low-temperature cooler and a second portion of the pumped cooled low-temperature coolant to a bypass without passing through the low-temperature cooler.

The method may further include transporting a high-temperature coolant from the engine to the first heating heat exchanger to produce a cooled high-temperature coolant. Optionally the cooled high-temperature coolant may be transported to a high-temperature cooler. Optionally also, the method may include transporting a first portion of the cooled high-temperature coolant to a high-temperature cooler and a second portion of the cooled high-temperature coolant to a bypass without passing through the high-temperature cooler.

One or more advantageous features as described herein will be readily apparent from the following detailed description of one or more embodiments when taken in connection with the accompanying drawings.

BRIEF DESCRIPTION OF THE DRAWINGS

For a more complete understanding of one or more embodiments of the present invention, reference is now made to the one or more embodiments illustrated in greater detail in the accompanying drawings and described below wherein.

DETAILED DESCRIPTION OF ONE OR MORE EMBODIMENTS

Figure 1:
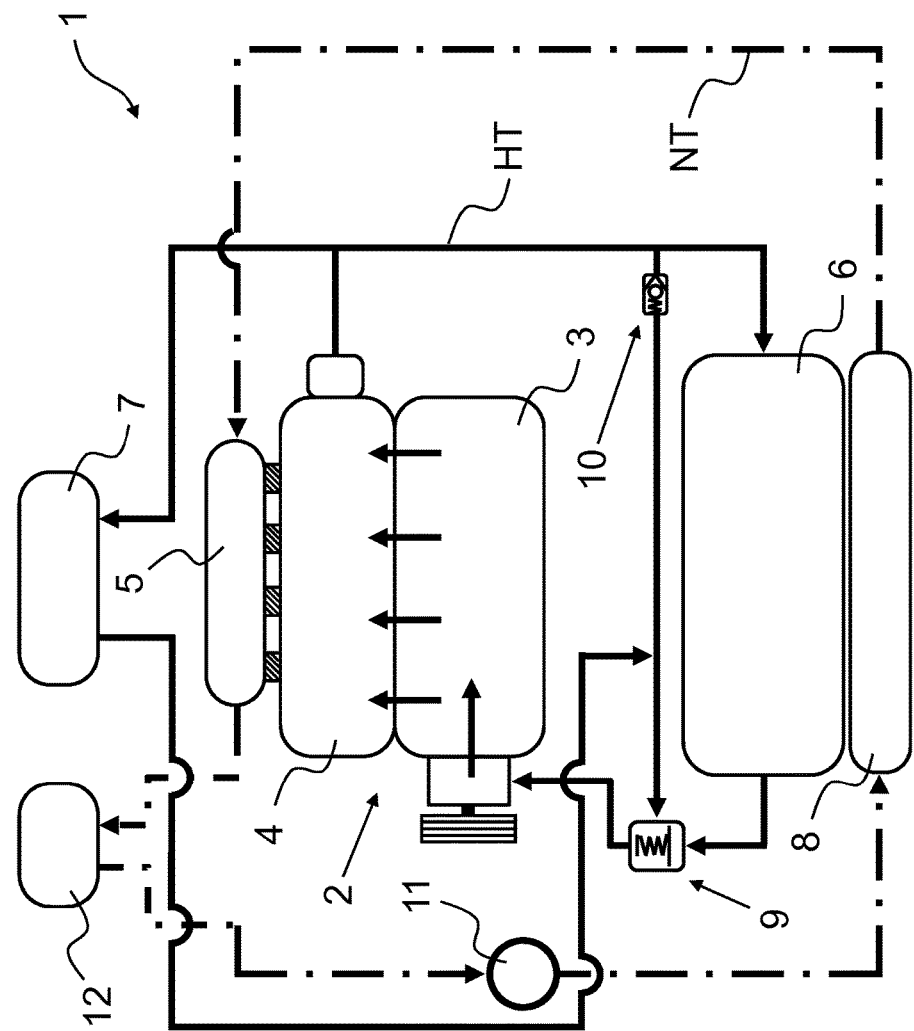
FIG. 1 shows a schematic view of a vehicle heating system according to one or more embodiments of the invention, emphasizing a low-temperature cooling circuit.

As referenced in the FIGS., the same reference numerals are used to refer to the same components. In the following description, various operating parameters and components are described for different constructed embodiments. These specific parameters and components are included as examples and are not meant to be limiting.

The present invention in one or more embodiments is advantageous at least in providing a vehicle heating system and a method of using the same to heat a vehicle interior relatively more quickly and more economically, even when at idle or during the cold running phase of the vehicle.

The vehicle heating system according to one or more embodiments of the present invention for heating the interior of a vehicle includes an internal combustion engine and a turbocharger. A charge air cooler is furthermore arranged between the turbocharger and the internal combustion engine. The turbocharger and the charge air cooler are designed and arranged in such a way that the internal combustion engine can be supplied by the turbocharger with compressed combustion air that is first cooled in the compressed state by the charge air cooler. For this purpose, an intake section which, starting on an intake side, first of all has the turbocharger and, toward the internal combustion engine, has the charge air cooler arranged after the turbocharger can be provided.

In order to allow controlled cooling of the internal combustion engine and the charge air cooler, two mutually separate cooling circuits are provided. These differ in the maximum temperature of a coolant circulating within the respective cooling circuit. In this context, the internal combustion engine is coupled fluidly to a high-temperature cooling circuit, while the charge air cooler is coupled fluidly to a low-temperature cooling circuit.

According to one or more embodiments of the present invention, the vehicle heating system has a heating heat exchanger, which is coupled fluidly to the low-temperature cooling circuit. Moreover, the low-temperature cooling circuit has a low-temperature cooler. The low-temperature cooler is provided for the purpose of cooling low-temperature coolant circulating within the low-temperature cooling circuit. This allows continuous cooling of the low-temperature coolant. In addition, the low-temperature cooling circuit has a bypass. In this case, the bypass is arranged in such a way that it can be used to bypass the low-temperature cooler for the low-temperature coolant.

The particular advantage of the arrangement according to one or more embodiments of the present invention is that it allows the heat energy which is available in any case from the charge air cooler to be used directly for heating the interior of the vehicle. Owing to the normally continuous operation of the turbocharger, the combustion air compressed by the charger makes available high heat energy from the start. The air is heated by the pressure charging process itself, and the waste heat which arises in the process is released directly to the low-temperature cooling circuit. Since the thermal mass of the low-temperature cooling circuit is less than that of the high-temperature cooling circuit, a relevant amount of heat energy can thus be released to the heating heat exchanger and hence to the vehicle interior within a short time.

The particular advantage in the arrangement of the bypass may be regarded as the fact that it is possible not to cool the low-temperature coolant continuously by means of the low-temperature cooler but only when required.

In principle, it is envisaged that the vehicle heating system according to one or more embodiments of the present invention and, in particular, the heating heat exchanger arranged after the charge air cooler can be combined with further heating elements. In the sense according to one or more embodiments of the present invention, a further heating heat exchanger already coupled to the high-temperature cooling circuit and/or at least one PTC heating element, in particular, may be regarded as further heating elements. Of course, the heating elements may also include all such heating elements which serve to generate energy in the form of heat.

In one or more particular embodiments of the vehicle heating system, the present invention in one or more embodiments envisages that the heating heat exchanger can be arranged downstream of the charge air cooler. This is relevant in as much as the low-temperature cooling circuit normally has a low-temperature cooler which receives a flow of the heated low-temperature coolant in order to cool the latter. By virtue of the fact that the heating heat exchanger is arranged after the charge air cooler, the low-temperature coolant leaving the charge air cooler initially passes through the heating heat exchanger before it is directed to the low-temperature cooler. In this way, some of the heat energy made available by means of the low-temperature coolant leaving the charge air cooler is advantageously released to the heating heat exchanger before the low-temperature coolant is cooled.

In another advantageous embodiment, it is envisaged that the heating heat exchanger can be arranged within a branch leading to the low-temperature cooling circuit. The arrangement of the branch makes it possible for the heating heat exchanger not to receive a continuous flow of the low-temperature coolant of the low-temperature cooling circuit. For this purpose, corresponding actuating devices are required in order to direct the flow of the low-temperature coolant accordingly. Moreover, the arrangement of a branch allows simple integration of an additional heating heat exchanger into an already existing main heating heat exchanger without having to interfere to any great extent in an existing vehicle heating system.

According to an advantageous development, the above-mentioned actuating device can be formed by at least one valve. The valve may be arranged upstream of the heating heat exchanger, between the branch and the low-temperature cooling circuit. Arranging the actuating device ahead of the heating heat exchanger ensures that the heating heat exchanger is supplied with the low-temperature coolant of the low-temperature cooling circuit only when required. The valve can furthermore be designed as a junction, being able to bring about division of the low-temperature cooling circuit while incorporating the branch, when required.

A suitable automation system, which controls the valve concerned according to predetermined rules, is furthermore conceivable. Thus, opening the valve in favor of the branch would be worthwhile whenever the amount of energy demanded in the interior of the vehicle was not sufficient to heat it. This could be worthwhile especially in a cold phase of the internal combustion engine, after the latter had been cold started, in which the high-temperature cooling circuit would not yet be carrying sufficient warm high-temperature coolant.

In principle, it is considered advantageous if the high-temperature cooling circuit is decoupled from the low-temperature cooling circuit. Accordingly, no further elements or device that could bring about mixing of the low-temperature coolant with the high-temperature coolant are provided either.

The advantage of generally eliminating any mixing of the high-temperature coolant with the low-temperature coolant and vice versa is based on the fact that the thermal mass of the high-temperature cooling circuit is very high. Owing to the consequent high heat storage capacity, the heat energy of the low-temperature cooling circuit would quickly be transferred to the high-temperature cooling circuit, especially in the cold phase of the internal combustion engine, in the event of mixing, and therefore the positive effect for the heating of the vehicle interior would be very small.

The heating heat exchanger can be the main heating heat exchanger which is onboard the vehicle in any case or, alternatively, an additional heating heat exchanger provided in addition to the latter. If a single main heating heat exchanger is provided, it can be coupled fluidly both to the high-temperature cooling circuit and to the low-temperature cooling circuit of the vehicle heating system. In this case too, there is particularly a division between the cooling circuits, despite the high-temperature and the low-temperature cooling circuits having a joint connection to the main heating heat exchanger. In other words, in this case too there is no mixing between the coolants in the two cooling circuits at the junction formed between the circuits by the main heat exchanger. Thus, despite common admission to the main heating heat exchanger, the low-temperature coolant circulates within the low-temperature cooling circuit and a high-temperature coolant circulates within the high-temperature cooling circuit.

The present invention in one or more embodiments discloses an extremely advantageous vehicle heating system which makes it possible to heat the interior of a vehicle economically overall. Thanks to a minimum of parts required in addition to the already existing elements, there is no significant increase in the weight of the vehicle in the context of one or more embodiments of the present invention. Moreover, the solution presented is extremely low cost since additional arrangement of any further auxiliary heaters, in the form of PTC heating elements for example, can be reduced to a minimum or even completely eliminated. The elimination of the auxiliary heaters further reduces the complexity of the vehicle heating system, allowing not only easier construction in production but also simplified servicing and maintenance. Moreover, reducing the construction of the vehicle heating system according to one or more embodiments of the present invention to just a few parts reduces any sources of faults to a minimum.

Thanks to the rapid availability of heat energy via the low-temperature cooling circuit, the circuit is available within a very short time and, furthermore, virtually continuously, especially at idle and during the cold running phase of the internal combustion engine, so as to ensure adequate heating of the interior in almost all phases of the use of the vehicle.

The present invention one or more embodiments furthermore also presents a method by means of which heating of the interior of a vehicle with a vehicle heating system indicated above is made possible. As already indicated above, the vehicle heating system includes an internal combustion engine coupled to a high-temperature cooling circuit, a turbocharger and a charge air cooler. In this arrangement, the internal combustion engine is supplied by the turbocharger with compressed combustion air that is first cooled in the compressed state by the charge air cooler, which is coupled to a low-temperature cooling circuit.

According to one or more embodiments of the present invention, a heating heat exchanger is provided which is coupled fluidly to the low-temperature cooling circuit. Here, the measure according to one or more embodiments of the present invention provides for at least some of a low-temperature coolant circulating through the low-temperature cooling circuit to be directed to the heating heat exchanger when required. Moreover, the low-temperature cooling circuit has a bypass for bypassing the low-temperature cooler. In this way, at least some of the low-temperature coolant can be passed either through the low-temperature cooler or through the bypass. The temperature of the low-temperature coolant can thereby be held at a desired level.

The resulting advantages have already been explained in the context of the vehicle heating system presented, and therefore attention is drawn at this point to the corresponding statements within the present description. Moreover, this also applies to the following explanations relating to the methodological part of one or more embodiments of the present invention.

Thus, a particular measure of the method according to one or more embodiments of the present invention envisages that the heating heat exchanger is arranged downstream of the charge air cooler and thus after the charge air cooler. In this way, the low-temperature coolant leaving the charge air cooler can be passed through the heating heat exchanger in order to release at least some of the heat energy contained in the low-temperature coolant to the interior of the vehicle via the heating heat exchanger.

Another advantageous embodiment proposes that the low-temperature cooling circuit is coupled to a low-temperature cooler. The low-temperature cooler serves to release the heat energy absorbed via the low-temperature coolant from the charge air cooler to the ambient air. The low-temperature coolant leaving the charge air cooler can be passed exclusively to the low-temperature cooler. As an alternative, at least some of the low-temperature coolant leaving the charge air cooler can be passed through the heating heat exchanger in advance. In this way, either none, part or almost all of the heat energy contained in the low-temperature coolant can be passed to the heating heat exchanger.

According to an advantageous development, the heating heat exchanger can be arranged within a branch leading to the low-temperature cooling circuit. The particular measure in this context envisages that the low-temperature coolant is circulated either only within the low-temperature cooling circuit in a first mode or through the low-temperature cooling circuit and at least partially via the branch through the heating heat exchanger in a second mode.

It is regarded as particularly advantageous if the path of a high-temperature coolant circulating in the high-temperature cooling circuit is matched to a cold phase or a warm phase of the internal combustion engine. In other words, the high-temperature coolant circulating in the high-temperature cooling circuit can pass through a small circuit or, alternatively, through a large circuit. In the cold phase of the internal combustion engine in particular, it ideally passes through the small circuit, in which the high-temperature coolant circulates almost exclusively around the engine block and the associated cylinder head and not through any other equipment. Rapid heating of the internal combustion engine to the operating temperature thereof is thereby made possible. As soon as the operating temperature has been reached, the coolant passes through the large circuit. This contains a high-temperature cooler which is coupled fluidly to the high-temperature cooling circuit. In this way, the high-temperature coolant is cooled by the high-temperature cooler as soon as the operating temperature of the internal combustion engine has been reached.

According to one or more embodiments of the present invention, it is now possible for at least some of the low-temperature coolant circulating through the low-temperature cooling circuit to be directed to the heating heat exchanger when required, independently of the cold phase and/or the warm phase of the internal combustion engine. In this way, the heat energy transported by the low-temperature cooling circuit is available independently of the cold phase or the warm phase of the internal combustion engine.

FIG. 1 shows a schematic view of a vehicle heating system 1 according to one or more embodiments of the present invention. The vehicle heating system 1 is used to heat the interior of a vehicle (not shown specifically).

The vehicle heating system 1 may include an internal combustion engine 2, which in the present case is divided into an engine block 3 and a cylinder head 4. In order to supply the internal combustion engine 2 with compressed combustion air in operation, a turbocharger (not shown specifically) is provided, the turbocharger being connected fluidly to the cylinder head 4 of the internal combustion engine 2 via a charge air cooler 5. Thus, the charge air cooler 5 is arranged between the internal combustion engine 2 and the turbocharger.

The internal combustion engine 2 is furthermore coupled fluidly to a high-temperature cooling circuit (HT), which, with reference to the illustration in FIG. 1, can be recognized as a thick solid line. There is furthermore a low-temperature cooling circuit (NT), which in the present case is illustrated as a thick chain-dotted line. In this case, the charge air cooler 5 is coupled fluidly to the low-temperature cooling circuit (NT). The use of the chain-dotted line has been chosen to enable the low-temperature cooling circuit (NT) to be distinguished easily by sight from the high-temperature cooling circuit (HT). As can be seen, both the low-temperature cooling circuit (NT) and the high-temperature cooling circuit (HT) are constructed separately from one another and are thus decoupled from one another.

Even if one or more embodiments of the present invention discloses separation of the high-temperature cooling circuit (HT) and the low-temperature cooling circuit (NT), the fluidic connection thereof is conceivable in connection with the use of an expansion tank (not shown specifically here). In this case, the low-temperature cooling circuit (NT) could have a compensating line, in which a restrictor could be arranged. In this arrangement, the restrictor should have a diameter of 1.0 to 2.0 mm in order to minimize the mixing of the two cooling circuits (NT, HT), which is not shown in the present case.

While a high-temperature coolant circulates in a manner not shown specifically through at least some segments of the high-temperature cooling circuits (HT) during the operation of the internal combustion engine, a low-temperature coolant (likewise not shown specifically) flows through the low-temperature cooling circuit (NT). Owing to the separation of the low-temperature cooling circuit (NT) and the high-temperature cooling circuit (HT), there is consequently no mixing of the low-temperature coolant with the high-temperature coolant and vice versa.

Moreover, a high-temperature cooler 6 coupled fluidly to the high-temperature cooling circuit (HT) and a heating heat exchanger 7, likewise coupled fluidly to the high-temperature cooling circuit (HT), are provided. By the nature of the system, the heating heat exchanger 7 is a liquid heating heat exchanger. Also arranged within the high-temperature cooling circuit (HT) are a thermostat 9 and a spring-loaded check valve 10, which are likewise coupled fluidly to the high-temperature cooling circuit (HT).

On the other hand, a low-temperature cooler 8 and a pump 11 are furthermore present, each being coupled fluidly to the low-temperature cooling circuit (NT). In the present version of the low-temperature cooling circuit (NT), the circuit furthermore has a further heating heat exchanger 12. In this arrangement, the heating heat exchanger 12 is arranged downstream of the charge air cooler 5.

The heating heat exchangers 7, 12 are each heat exchangers provided for heating the interior of the vehicle (not shown specifically). To enable them to be distinguished more easily, the heating heat exchanger 7 coupled to the high-temperature cooling circuit (HT) is referred to below as the main heating heat exchanger 7, and the heating heat exchanger 12 coupled to the low-temperature cooling circuit (NT) is referred to as the additional heating heat exchanger 12.

In order to clarify the possible states of the high-temperature cooling circuit (HT), FIG. 2 will be explained in greater detail below.

Figure 2:
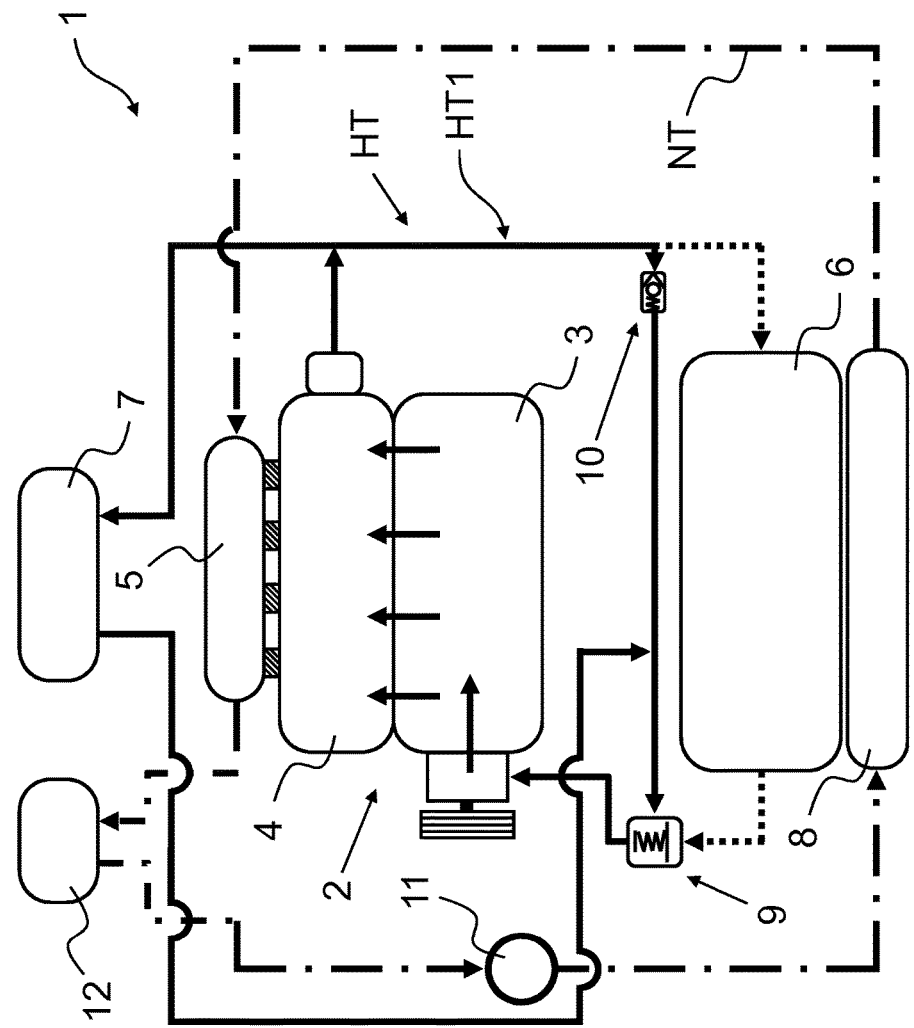
FIG. 2 shows another schematic view of the vehicle heating system referenced in FIG. 1, emphasizing a small circuit within the high-temperature cooling circuit.

As compared with the illustration in FIG. 1, FIG. 2 concentrates on emphasizing the high-temperature cooling circuit (HT) and, in this case, especially a small cooling circuit (HT1) of the high-temperature cooling circuit (HT). For greater clarity, the low-temperature cooling circuit (NT) is to this end again illustrated in chain-dotted lines, while the high-temperature cooling circuit (HT) is shown partially in dotted lines. The remaining part of the high-temperature cooling circuit (HT), which is shown in thick solid lines, forms the small cooling circuit (HT1). The latter circuit is active particularly in the cold phase of the internal combustion engine 2 following the cold starting thereof, in order to enable the internal combustion engine 2 to warm up to its operating temperature as quickly as possible.

The decisive element in the activation of the small cooling circuit (HT1) is the thermostat 9, which, in a first position, prevents the high-temperature coolant from being directed to the internal combustion engine 2 via the high-temperature cooler 6. This reduces the circulation of the high-temperature coolant to the small cooling circuit (HT1). The small cooling circuit (HT1) ensures that most of the high-temperature coolant flows through the internal combustion engine 2, out of the latter and back into the internal combustion engine 2 via the check valve 10. At the same time, a small part of the high-temperature coolant also flows through the heating heat exchanger 7 and, via the thermostat 9, back to the internal combustion engine 2. In principle, the high-temperature cooling circuit or the small high-temperature cooling circuit (HT) can also be operated without the check valve 10. The advantage in using the check valve 10 is that it is thereby possible to ensure that there is a sufficient flow of the high-temperature coolant through the heating heat exchanger 7, even at low speeds of the internal combustion engine 2 and hence low volume flows. In the present case, the pump that is likewise required for circulation of the high-temperature coolant is arranged on the engine block 3 of the internal combustion engine 2 and is not explained further.

Figure 3:
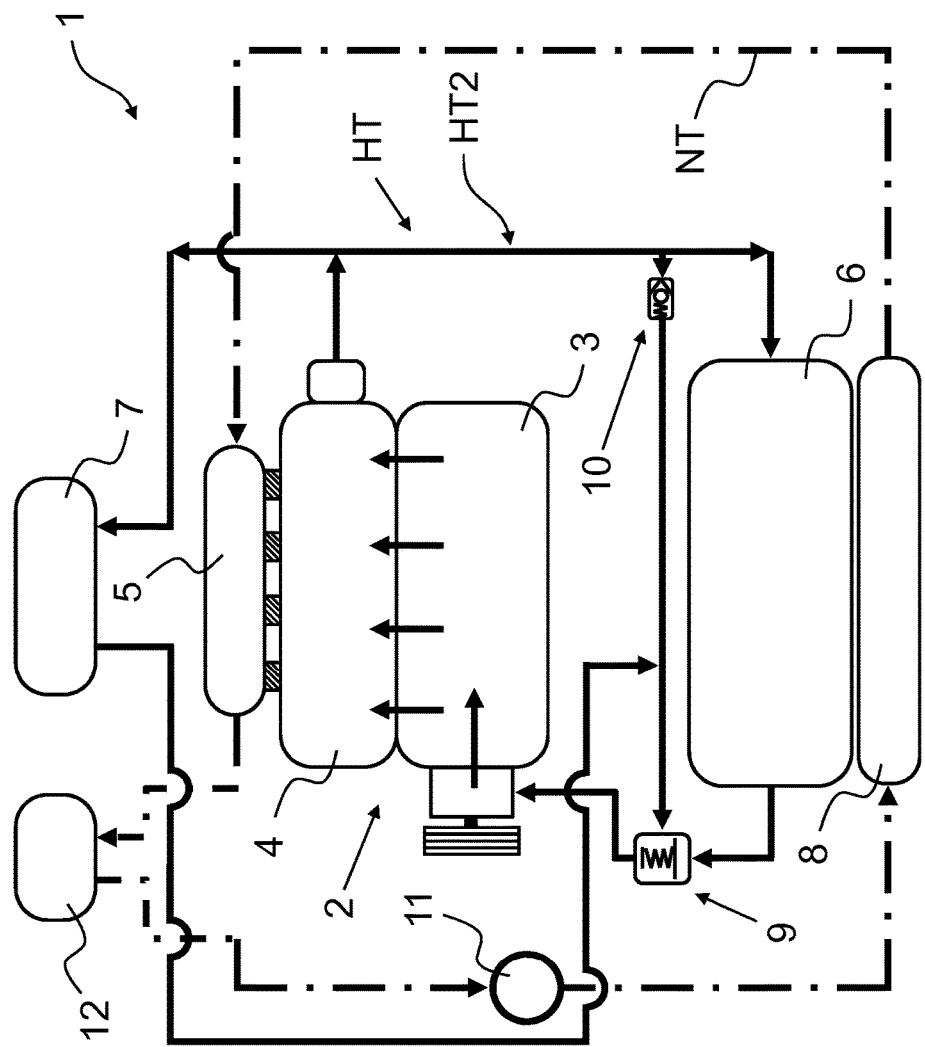
FIG. 3 shows yet another schematic view of the vehicle heating system referenced in FIG. 1, emphasizing a large circuit within the high-temperature cooling circuit.

FIG. 3 then shows the state of the high-temperature cooling circuit (HT) after the thermostat 9, having reached a predetermined temperature of the high-temperature coolant, switches to a second position.

As can be seen, it is then possible in the second position of the thermostat 9 for the high-temperature coolant also to pass via the high-temperature cooler 6. In the present case, therefore, a large cooling circuit (HT2) of the high-temperature cooling circuit (HT) is shown, allowing the cooling of the high-temperature coolant by the high-temperature cooler 6. As in the illustration in FIG. 2, the large cooling circuit (HT2) is likewise indicated by a thick solid line.

Figure 4:
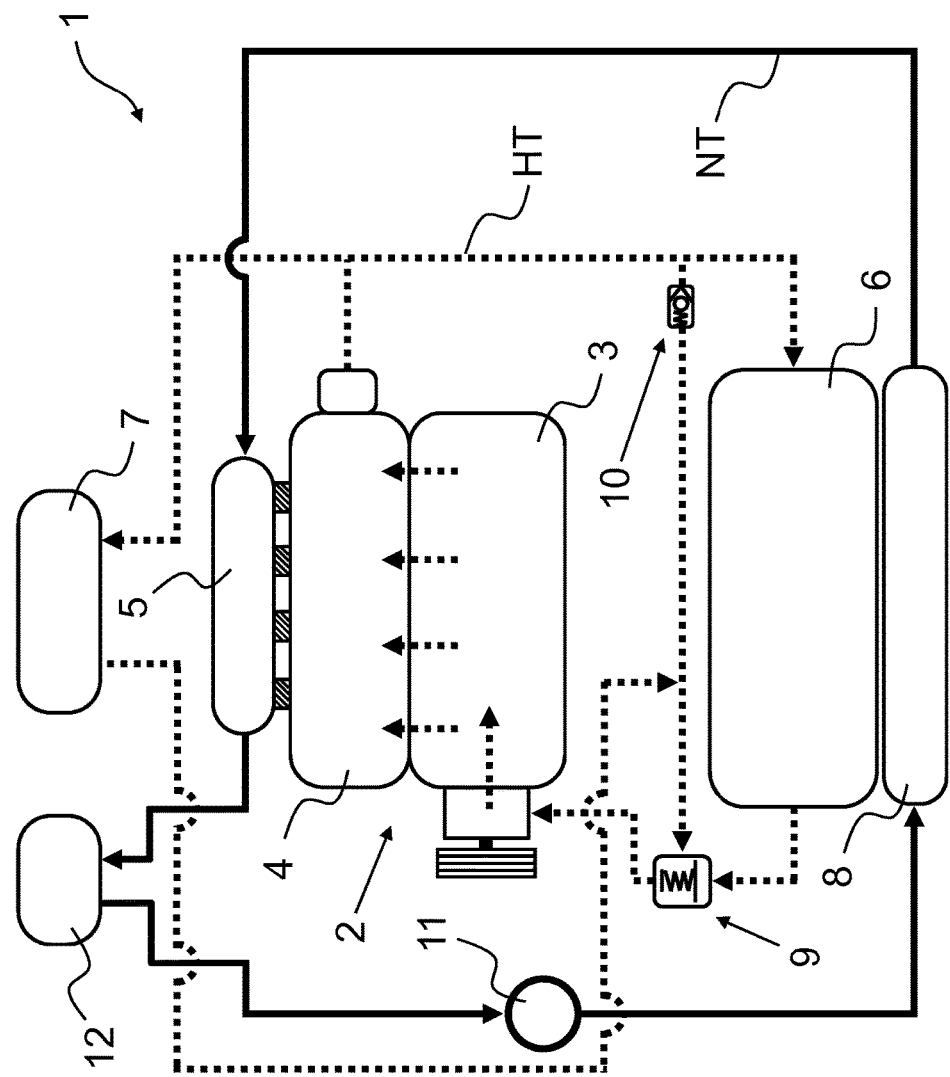
FIG. 4 shows yet another schematic view of the vehicle heating system referenced in FIG. 1, emphasizing a low-temperature cooling circuit.

FIG. 4 also concentrates primarily on illustrating the low-temperature cooling circuit (NT). For this purpose, the circuit is indicated by a thick solid line, while the high-temperature cooling circuit (HT) is reduced to being illustrated as a dotted line. As can be seen, the low-temperature coolant circulating within the low-temperature cooling circuit (NT) can be operated independently of the position of the thermostat 9 and thus independently of the operation of the small cooling circuit (HT1) or of the large cooling circuit (HT2). For this purpose, the low-temperature coolant is passed through the low-temperature cooling circuit (NT) by means of the pump 11. During this process, the heat energy absorbed by the low-temperature coolant in the charge air cooler 5 is transferred to the additional heating heat exchanger 12 and passed through the latter. Air can then be made to flow through and/or around the additional heating heat exchanger 12, which is constructed in a conventional manner as a gas/coolant heat exchanger, in order to release at least some of the heat energy from the low-temperature coolant to the air.

Figure 5:
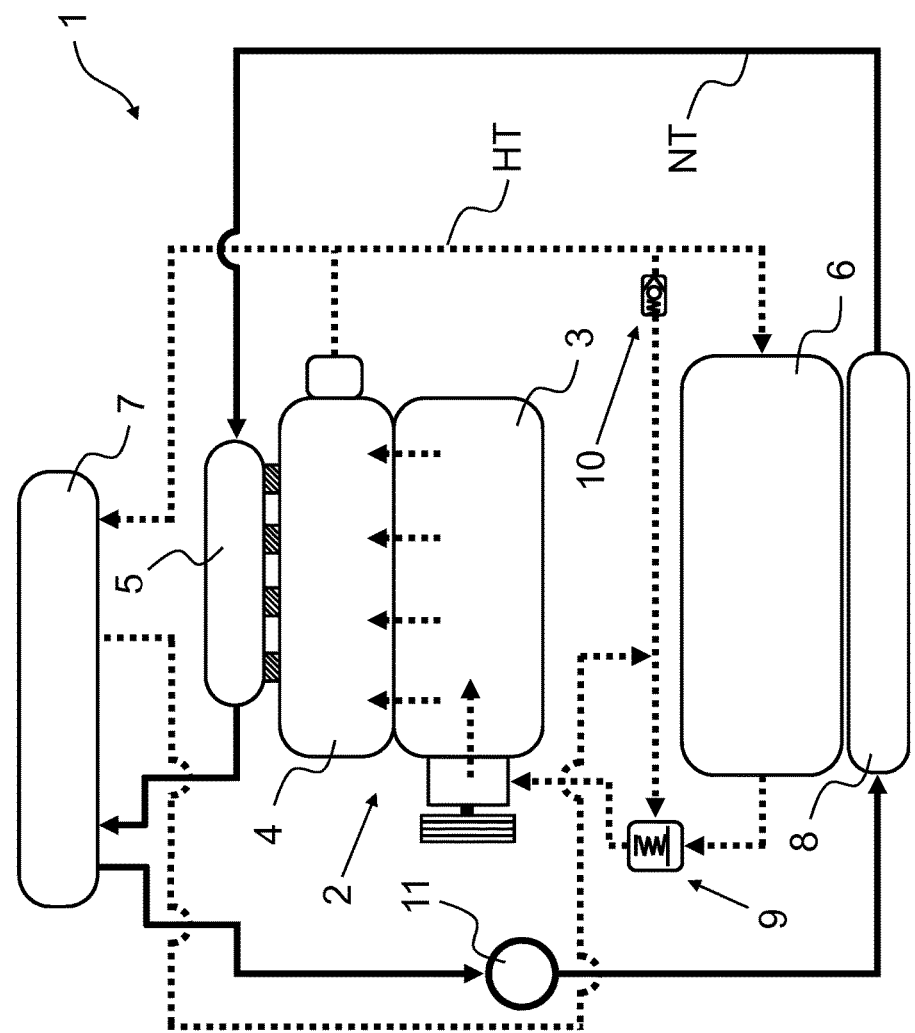
FIG. 5 shows another schematic view of the vehicle heating system referenced in FIG. 4, emphasizing the low-temperature cooling circuit in a first version.

FIG. 5 shows an alternative embodiment of the vehicle heating system 1 according to one or more embodiments of the present invention, which now dispenses with the additional heating heat exchanger 12 in favor of a single heating heat exchanger 7. As can be seen, heating heat exchanger 7 combines in itself the main heating heat exchanger 7 shown above and the additional heating heat exchanger 12. In this arrangement, heating heat exchanger 7 is coupled fluidly both to the low-temperature cooling circuit (NT) and to the high-temperature cooling circuit (HT). In this arrangement, it is envisaged that there will be no mixing of the low-temperature coolant and of the high-temperature coolant in this case.

Figure 6:
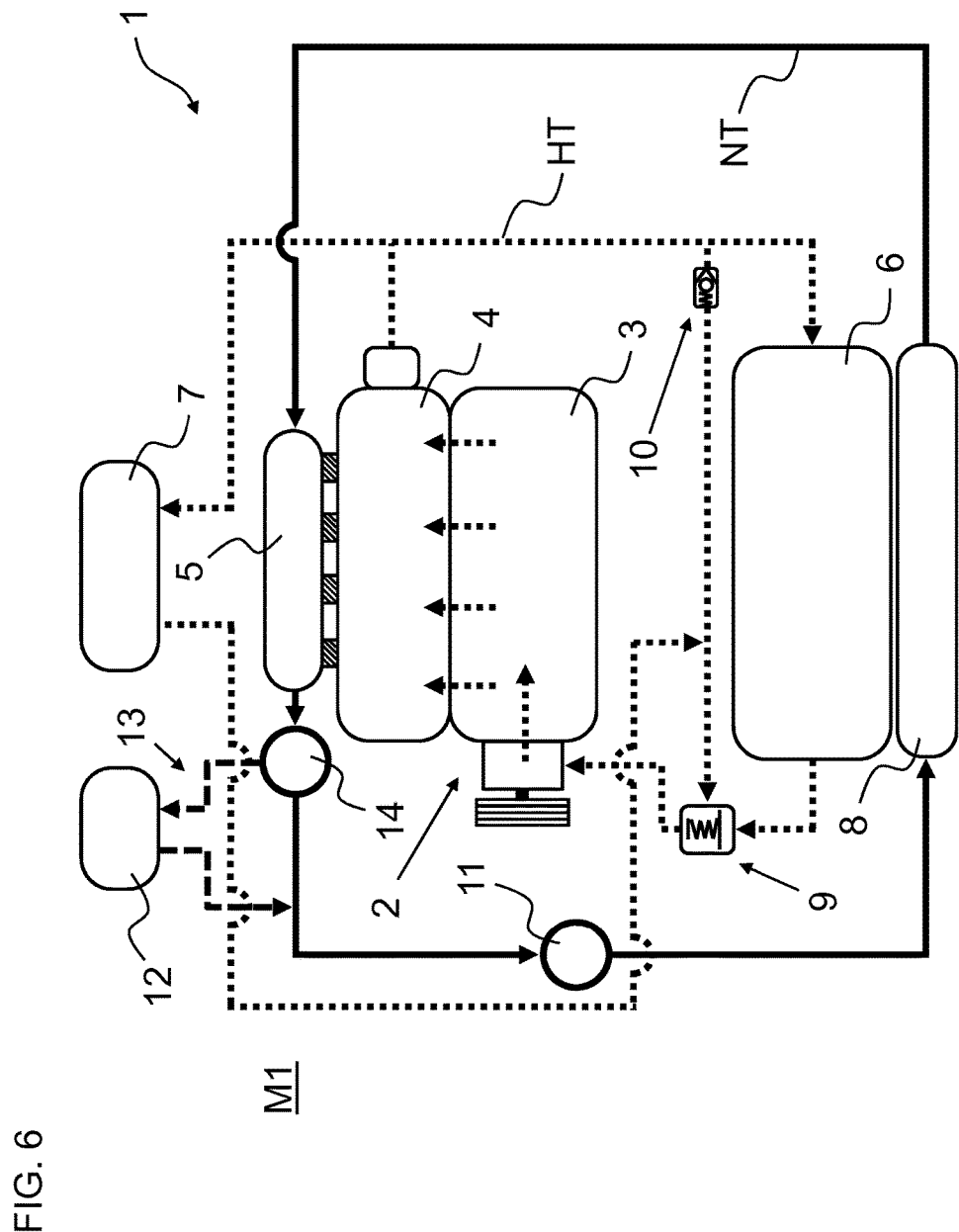
FIG. 6 shows yet another schematic view of the vehicle heating system referenced in FIG. 4, emphasizing the low-temperature cooling circuit in a second version.

FIG. 6 shows a variant of the construction of the low-temperature cooling circuit (NT), based on the vehicle heating system 1 according to one or more embodiments of the present invention from FIGS. 1 to 4. Here, a branch 13 leading to the low-temperature cooling circuit (NT) is provided, the branch extending parallel to a section of the low-temperature cooling circuit (NT) between the charge air cooler 5 and the pump 11. The branch 13 thus forms the bypass to the section of the low-temperature cooling circuit (NT). The additional heating heat exchanger 12 is arranged within the branch 13. Here too, the additional heating heat exchanger 12 is, of course, coupled fluidly to the low-temperature cooling circuit (NT). A valve 14 is furthermore arranged upstream of the additional heating heat exchanger (12). The valve 14 is integrated between the branch 13 and the low-temperature cooling circuit (NT).

FIG. 6 now shows a first mode M1 of the low-temperature cooling circuit (NT), in which the low-temperature coolant circulates only within the low-temperature cooling circuit (NT) owing to a first position of the valve 14. Accordingly, the branch 13 indicated by a thick solid line and hence the additional heating heat exchanger 12 are not supplied with the heat energy of the low-temperature coolant here. Another position of the valve 14 and the resulting path of the low-temperature coolant are shown in FIG. 7.

Figure 7:
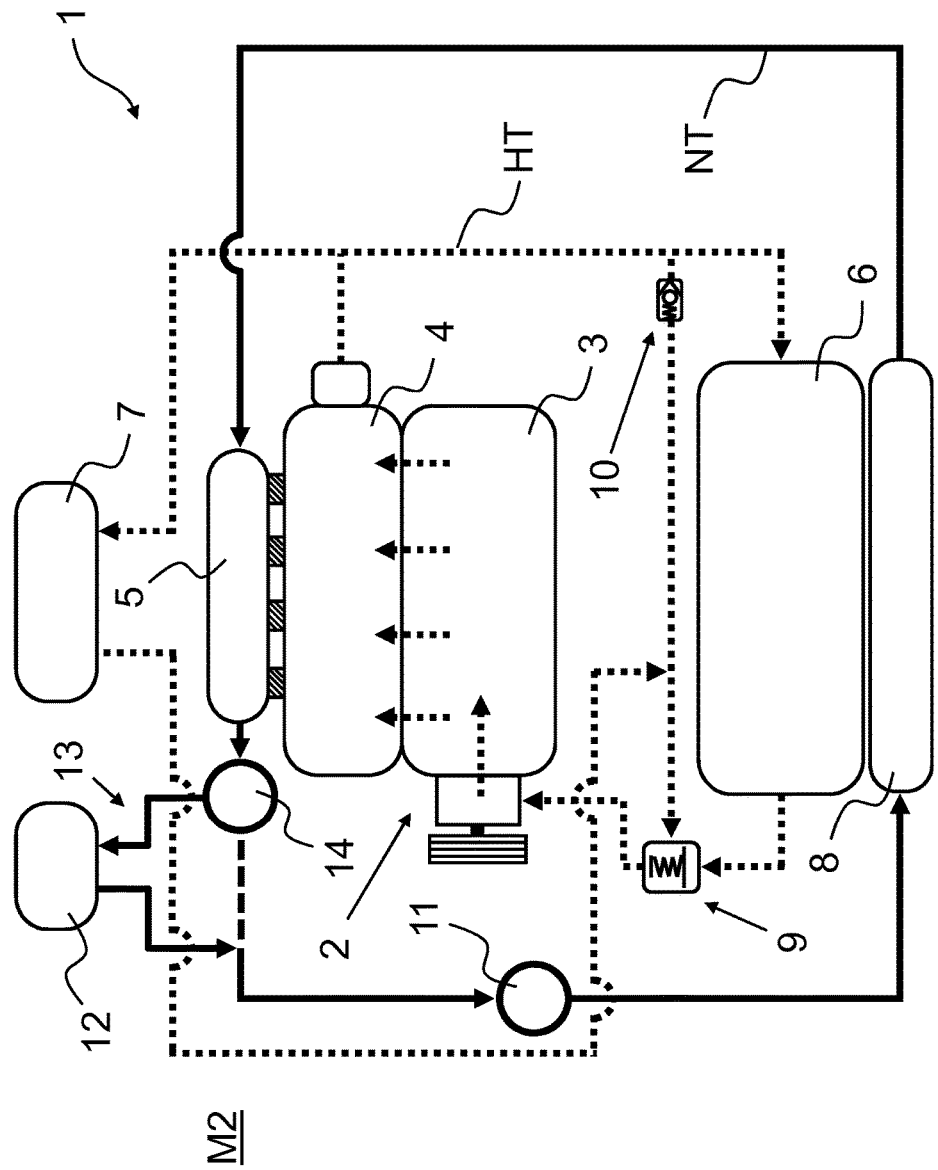
FIG. 7 shows another schematic view of the vehicle heating system referenced in FIG. 6, emphasizing the low-temperature cooling circuit in another mode with a different path.

FIG. 7 shows the path of the low-temperature coolant in a second mode M2 of the low-temperature cooling circuit (NT). As can be seen, the low-temperature coolant now flows through the branch 13 in this position of the valve 14, with the result that the additional heating heat exchanger 12 is supplied with the heat energy of the low-temperature coolant. In the present case, the path of the low-temperature coolant through the additional heating heat exchanger 12 is indicated by a thick solid line. In the illustrated second mode M2 of the low-temperature cooling circuit (NT), in contrast, the flow of low-temperature coolant in the section after the valve 14 is interrupted, the section being indicated in the present case by a thick broken line.

Figure 8:
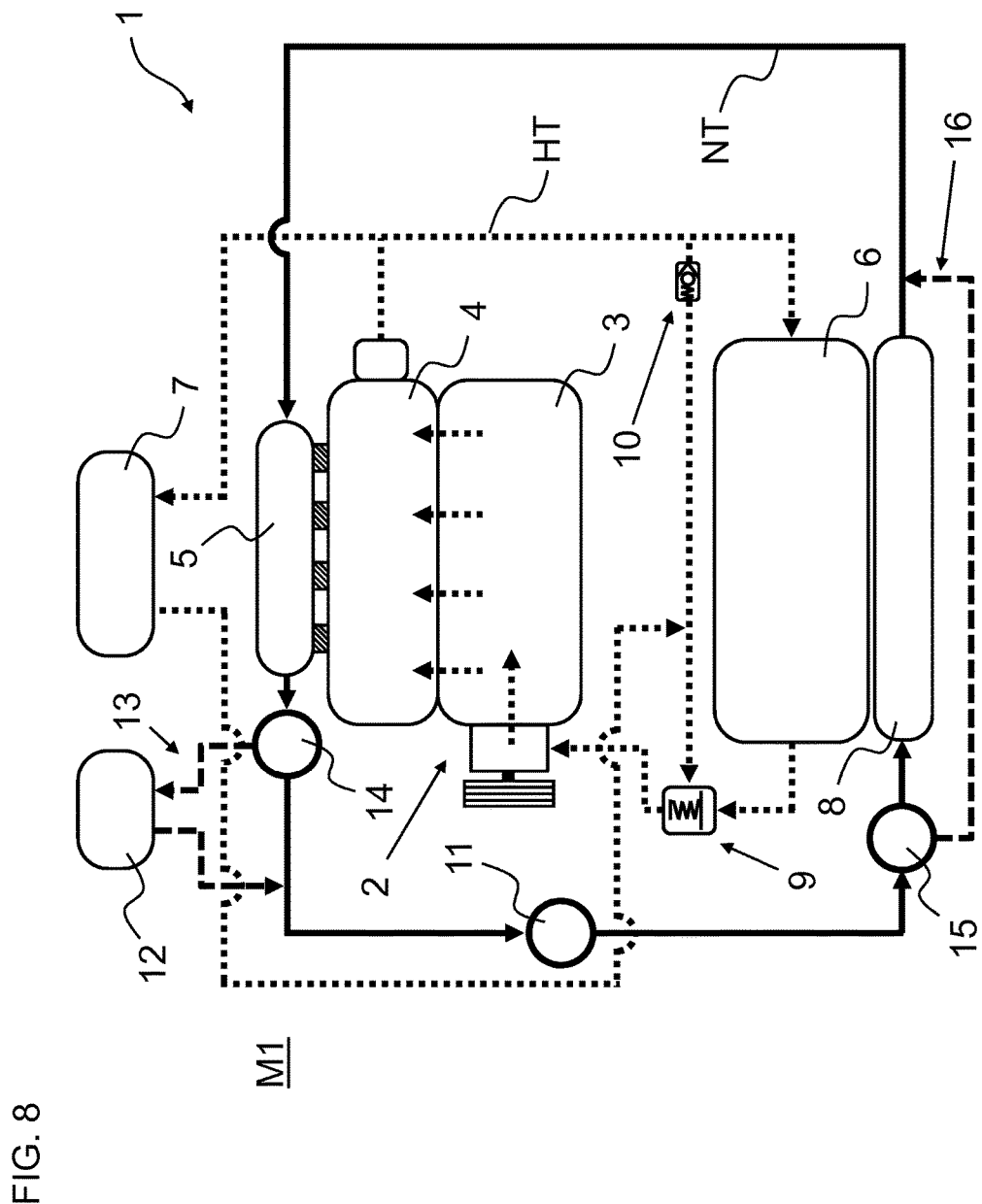
FIG. 8 shows yet another schematic view of the vehicle heating system referenced in FIG. 6, emphasizing the low-temperature cooling circuit in a third version.

FIG. 8 shows another advantageous variant relating to the low-temperature cooling circuit (NT). As can be seen, this variant has another valve 15, which is arranged between the pump 11 and the low-temperature cooler 8. In the present case, the valve 15 is connected to a bypass 16, via which the low-temperature cooling circuit (NT) can be operated while bypassing the low-temperature cooler 8. Depending on the position of the valve 15, it is thus advantageously possible to prevent what would otherwise be continuous cooling of the low-temperature coolant by the low-temperature cooler 8, insofar as desired. In combination with a control system (not shown specifically), it is thereby possible to keep the temperature of the low-temperature coolant at a particular level.

In one or more embodiments, the present invention as set forth herein is believed to have overcome certain challenges faced by known production of vehicle interior heating. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A vehicle heating system for a vehicle with an engine and a charge air cooler, comprising:
   a high-temperature cooling circuit coupled to the engine, said high-temperature cooing circuit having an extended circuit having a check valve in fluid communication with a thermostat;
   a low-temperature cooling circuit coupled to the charge air cooler and including a low-temperature cooler;
   a single heating heat exchanger coupled to said low-temperature cooling circuit and said high-temperature cooling circuit; and
   a redirecting valve positioned downstream of the charge air cooler and upstream of said single heating heat exchanger, said redirecting valve operable between a first position and a second position,
   wherein, when the redirecting valve is in one of the first and second positions, the single heating heat exchanger is in communication with the low-temperature cooling circuit via a first bypass downstream of the redirecting valve,
   wherein said heating heat exchanger is positioned downstream of the charge air cooler such that said heating heat exchanger can receive coolant exiting the charge air cooler prior to entering said low-temperature cooler.

2. The vehicle heating system of claim 1, wherein the low-temperature cooling circuit further includes a second bypass for bypassing the low-temperature cooler.

3. The vehicle heating system of claim 1, wherein the high-temperature cooling circuit is decoupled from the low-temperature cooling circuit.

4. A method of heating an interior of a vehicle including an engine and a charge air cooler, comprising:
   providing to the vehicle a vehicle heating system, wherein the vehicle heating system includes a single heating heat exchanger, a high-temperature cooling circuit coupled to the engine and said heating heat exchanger, said high-temperature cooling circuit having a check valve and a thermostat, said check valve being in fluid communication with said thermostat, and a low-temperature cooling circuit coupled to the charge air cooler and said heating heat exchanger, said low-temperature cooling circuit having a low-temperature cooler, and further wherein said heating heat exchanger can receive coolant exiting the charge air cooler prior to entering said low-temperature cooler.

5. The method of claim 4, wherein the high-temperature cooling circuit and the low-temperature cooling circuit are operated with no exchange of coolant there between.

6. The method of claim 4, further comprising transporting a low-temperature coolant from the charge air cooler to the heating heat exchanger to produce a cooled low-temperature coolant.

7. The method of claim 6, further comprising pumping the cooled low-temperature coolant via a pump to produce a pumped cooled low-temperature coolant.

8. The method of claim 7, further comprising transporting the pumped cooled low-temperature coolant to a low-temperature cooler.

9. The method of claim 7, further comprising transporting a first portion of the pumped cooled low-temperature coolant to a low-temperature cooler and a second portion of the pumped cooled low-temperature coolant to a bypass without passing through the low-temperature cooler.

10. The method of claim 4, further comprising transporting a high-temperature coolant from the engine to said heating heat exchanger to produce a cooled high-temperature coolant.

11. The method of claim 10, further comprising transporting the cooled high-temperature coolant to a high-temperature cooler.

12. The method of claim 10, further comprising transporting a first portion of the cooled high-temperature coolant to a high-temperature cooler and a second portion of the cooled high-temperature coolant to a bypass without passing through the high-temperature cooler.

13. A vehicle heating system of a vehicle including an engine connected to a charge air cooler, comprising:
    a high-temperature cooling circuit coupled to the engine and including a check valve and a thermostat, said check valve being in fluid communication with said thermostat;
    a low-temperature cooling circuit coupled to the charge air cooler and including a low-temperature cooler and a bypass for bypassing the low-temperature cooler; and
    a single heating heat exchanger coupled to said high-temperature cooling circuit and said low-temperature cooling circuit, said heating heat exchanger positioned downstream of the charge air cooler such that said heating heat exchanger can receive coolant exiting the charge air cooler prior to entering said low-temperature cooler.

14. The vehicle heating system of claim 13, wherein the low-temperature cooling circuit further includes a pump positioned downstream of the charge air cooler and downstream of said heating heat exchanger.

* * * * *